US012482266B2

(12) United States Patent
Smith

(10) Patent No.: US 12,482,266 B2
(45) Date of Patent: Nov. 25, 2025

(54) ELECTRONIC MONITORING SYSTEM AND METHOD WITH BIFURCATED VIDEO STORAGE SYSTEM

(71) Applicant: Arlo Technologies, Inc., Carlsbad, CA (US)

(72) Inventor: Vincent Smith, Langley (CA)

(73) Assignee: Arlo Technologies, Inc., Carlsbad, CA (US)

( * ) Notice: Subject to any disclaimer, the term of this patent is extended or adjusted under 35 U.S.C. 154(b) by 62 days.

(21) Appl. No.: 18/506,377

(22) Filed: Nov. 10, 2023

(65) Prior Publication Data

US 2025/0157219 A1    May 15, 2025

(51) Int. Cl.
*G06V 20/52* (2022.01)
*G06V 20/40* (2022.01)
*H04N 7/01* (2006.01)

(52) U.S. Cl.
CPC .............. *G06V 20/52* (2022.01); *G06V 20/44* (2022.01); *H04N 7/0117* (2013.01)

(58) Field of Classification Search
CPC ....... G06V 20/52; G06V 20/44; H04N 7/0117
See application file for complete search history.

(56) References Cited

U.S. PATENT DOCUMENTS

2009/0219411 A1\* 9/2009 Marman ................ H04N 5/772
348/231.99

\* cited by examiner

*Primary Examiner* — Girumsew Wendmagegn
(74) *Attorney, Agent, or Firm* — Boyle Fredrickson, S.C.

(57) ABSTRACT

An electronic monitoring system implements a bifurcated video storage strategy, which reduces reliance on offsite such as cloud storage demands by storing videos with different resolutions at different locations. Default storage of high-quality such as high-resolution videos of a monitored zone occurs onsite on an archive storage system, which may be provided by a data storage device(s) of a video camera or other imaging device that detects and video-captures the event(s). Default storage of reduced-quality such as low-resolution videos of monitored zone includes remote storage on a preview storage system, which may be provided by a cloud-based server that facilitates remote preview by a user. At a user's request, at least portions of the high-quality video(s) may be transmitted to the cloud-based server to allow remote preview by the user. The system facilitates preserving or archiving the high-resolution video based on user input following the preview.

18 Claims, 7 Drawing Sheets

ELECTRONIC MONITORING SYSTEM AND METHOD WITH BIFURCATED VIDEO STORAGE SYSTEM

BACKGROUND OF THE INVENTION

1. Field of the Invention

The present invention relates to an electronic monitoring system and, more particularly, to an electronic monitoring system with a bifurcated video storage system that stores videos of different resolutions at different locations, facilitating the preservation of high resolution or high quality videos while reducing data storage demands of offsite data storage such as cloud data storage. The invention additionally relates to a method of operating such a system.

2. Discussion of the Related Art

Security and other monitoring systems are increasing in popularity and technical sophistication. Such systems typically include at least one, and more typically more, imaging devices that communicate wirelessly with a smart phone or other user device via one or more internal controllers and/or one or more external controllers, such as a cloud-based server. Each imaging device includes a camera capable of capturing and transmitting still and video images, and many imaging devices also include a microphone and a speaker and/or other sensor(s) such as CO sensors.

Imaging device technology has improved over time, including advancements that allow for capturing and transmitting videos (and images) at higher resolutions than was previously practical. Video (and image) resolution relates to the density of the number of pixels in an image frame, in other words, the number of pixels per unit-area that can be displayed. A higher resolution value corresponds to a greater number of pixels per unit-area and provides higher quality and/or more clarity and sharpness compared to a lower resolution version of the same image. Examples of known high-resolution video formats are typically described in terms of width and height in units of pixels, including the 4K format with a resolution of 3840×2160 pixels, 2K format with a resolution of 2048×1080 pixels, Full HD or 1080p format with a resolution of 1920×1080 pixels and HD (High Definition) or 720p format with a resolution value of 1280× 720 pixels. Standard resolution formats include the SD (Standard Definition) 480p format with a resolution of 640×480 pixels and the SD 360p format with a resolution of 640×360 pixels.

File compression or size reduction techniques are known for reducing file sizes of videos and images for storage and transmission. Various compression tools use algorithms that modify image frames to reduce the stored information while minimizing visually perceptible differences between the original and modified images. Some compression tools have algorithms that compare colors of pixels that are near each other within the image frame(s). The algorithm(s) eliminates at least some of the images' colors that are sufficiently similar to nearby colors, converting them into larger commonly-colored blocks, which reduces the overall amount of information within the image frame(s) and correspondingly reduces the overall file size. Other video compression tools modify spatial resolution (image frame dimension) and/or temporal resolution (framerate or bitrate). Tools that modify the spatial resolution change the dimensions of the image frames, such as reducing the resolution from a 4K format to a Full HD format to reduce the file size. Some tools modify the temporal resolution by reducing its framerate or reducing the number of image frames per second that are displayed. Other temporal resolution-modifying tools change data-related characteristics of a video's playback, transmission, or processing such as modifying data-transmission rate or bitrate (number of bits transmitted or processed per second) by converting the video file to a format that utilizes a lower bitrate, which reduces the file's size.

As should be apparent from the above, resolution and compression tend to be inversely related, though there is by no means a direct correspondence between the two. Generally speaking, images that have a high resolution and/or a low compression can be considered to be "higher quality images" or "higher quality videos", whereas images that have a low resolution and/or high compression are considered to be "lower quality images", "lower quality videos", "reduced-quality images", or reduced-quality videos".

There are competing benefits to utilizing higher-quality videos in a monitoring system versus reduced-quality videos. Reduced-quality videos have smaller file sizes than higher-quality videos, which provides various advantages. Smaller sized files generally require less storage space and can transmitted at higher bit rates, which may facilitate their analysis from remote locations and may reduce costs associated with data storage and transmission. Higher quality videos offer various other advantages over lower or reduced-quality videos, such as those related to enhanced detailed analyses. In higher-quality videos, small portions of image frames can be substantially enlarged with far less image degradation compared to lower or reduced-quality counterpart image frames. This may allow for analyzing fine details such as facial features or license plate numbers that may be impractical in lower or reduced-quality videos due to pixilation or other image degradation. This facilitates using the monitoring system for identification tasks by implemented higher-quality videos.

Efforts to try benefitting from the advantages of both higher-quality videos and lower or reduced-quality videos have proven frustrating. This may be especially true when implementing a monitoring system with subscription-based data storage services, such as cloud-based storage systems, that can have substantial data storage and transmission costs. Some of these efforts include compromising between higher-quality and lower or reduced-quality by modifying videos to have characteristics between those categories by converting (compressing or otherwise) the video files to have intermediate file sizes. However, intermediate-sized video files occupy more storage space and require more bandwidth to transmit than high-compression/small-sized video files. This may make storage of intermediate-sized videos more costly than high-compression/small-sized video files, especially when used with subscription-based data storage services, such as various cloud-based storage systems. Furthermore, intermediate-sized video files may not offer enough clarity for a user to recognize fine details within image frames, such as license plate numbers. This may make intermediate-sized videos less effective than low-compression/large sized video files analysis that includes identification tasks.

Accordingly, a need exists for a monitoring system to simultaneously reduce the data storage and transmission requirements for videos while preserving options for analyzing high-quality video to facilitate, for example, identification tasks.

SUMMARY OF THE INVENTION

In accordance with a first aspect of the invention, at least some of the above-discussed challenges are addressed by an electronic monitoring system with a multi-quality or multi-resolution storage strategy that provides different default storage locations as a function of the quality, file size, and/or resolution of the video being stored. The system may include a bifurcated video storage system that provides different default storage locations for high quality videos with large(r) file sizes, such as high-resolution videos that may be uncompressed or have low compression values, and low or reduced quality videos with small(er) file sizes, such as highly compressed and/or low-resolution videos.

In accordance with another aspect of the invention, the bifurcated storage system may include default storage of reduced-quality-videos (including, low resolution videos, highly-compressed videos, and/or other reduced-quality or small-sized videos) in a first storage system and default storage of high-quality videos (including high resolution videos and uncompressed, minimally-compressed, and/or other high-quality or large-sized videos) in a second storage system. The first and second systems may be thought of as a preview storage system and an archive storage system, respectively. The reduced-quality videos may be initially accessible to a user device form the first storage system as a reduced-quality preview video. Upon a user request for a high-quality preview video, the system transmits at least a portion of the high-quality video from the archive storage system to the preview storage system, from which user device can retrieve a high-quality preview video.

In accordance with another aspect of the invention, the default storage of the high-quality video is temporary. The archive storage system may include a buffer storage device, such as a circular buffer, that temporarily stores the high-quality videos and automatically overwrites them upon filling/refilling the buffer dataset according to the buffer operational rules, such as by continuously overwriting by overwriting the oldest data first.

In accordance with another aspect of the invention, the high-quality video may be selectively saved, preserved, or archived. The archive storage system may include an archive storage device that stores the high-resolution videos and maintains their accessibility until, for example, the videos are selected for deletion.

In accordance with another aspect of the invention, the preview storage system may be provided offsite or within a WAN (wide area network) and may be provided on a cloud-based server. The archive storage system may be provided onsite or within a LAN (local area network) such as a WLAN (wireless local area network) and may be provided as a device-onboard configuration, such as in the video camera or other imaging device, itself.

In accordance with another aspect of the invention, the system facilitates staged previews or tiered assessments of videos of a monitored zone for selecting whether to archive high-quality videos or let them be passively overwritten. At each of multiple possible preview stages, a user has an option to archive the high-quality video. High-quality archive options may be presented during each of an initial preview of a reduced-quality video and a detailed preview of a high-quality video. The detailed preview of the high-quality video may be performed in multiple steps, such as by progressively viewing sequential segments of the high-quality video until either instructing the archiving or not authorizing transmission of additional high-quality video segments. The archiving may be performed automatically with an auto-archive feature in which the system evaluates the video and determines it corresponds to a high interest event, which typically corresponds to user-defined criteria.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
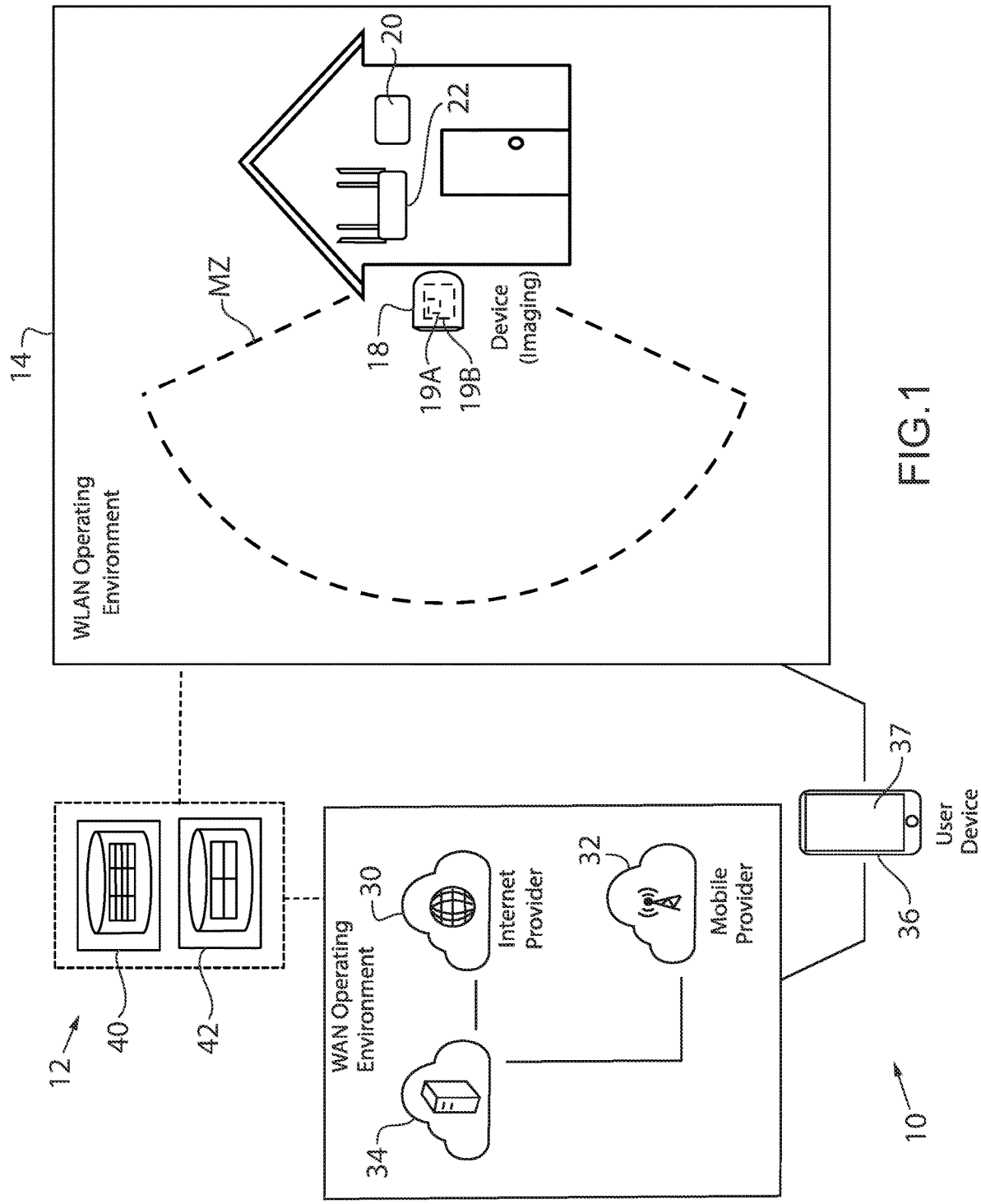
FIG. 1 is a schematic representation of an electronic monitoring system for implementing a bifurcated video storage system in accordance with an aspect of the invention.

Referring now to FIG. 1, in accordance with an aspect of the invention, an electronic monitoring system 10 is provided that includes a bifurcated video storage system 12 implemented in a WLAN (wireless local area network) 14 and a WAN (wide area network) 16 that is communicatively connected to the WLAN 14. Within WLAN 14, various "client devices" such as imaging devices, one of which is represented here as imaging device 18, are wirelessly networked to a base station hub 20 which, in turn, communicates with the WAN 16 via a gateway hub shown as gateway router 22. Most systems will employ several client devices, such as imaging device(s) 18, of the same or varying configurations as described below. Base station hub 20 may be eliminated as a stand-alone module if its functionality is incorporated into gateway router 22, in which case the router also serves as a base station hub. The system can communicate with one or more user devices 36 vie that WAN 16 and possibly the WLAN 14 as well.

Still referring to FIG. 1, the imaging device 18 may perform any of a variety of monitoring, sensing, and communicating functions. Typically, imaging device 18 includes a video camera configured to react to the detection of "triggering events" by awaking or being activated from a standby or sleep mode in which it acts as a passive monitor to an active or awake mode in which it captures, stores, and transmits visual images or video of the monitored area within the environment. The triggering event may be motion, and the detector may be a motion detector. Instead of or in addition to detecting motion, the detector could include an IR sensor detecting heat, such as the body heat of an animal or person. The triggering event also could be sound, in which case the detector may include a microphone. In this case, the triggering event may be a sound exceeding a designated decibel level or some other identifiable threshold. Triggering events are discussed in more detail below. The camera also may be activated by receipt of a command from a user device 36. The particular monitored area of the environment defines a monitored zone "MZ" in which the imaging device 18 can capture and store video of the events. Each imaging device 18 may be powered by a battery and has circuitry 19A that includes corresponding hardware, firmware, software, or any combination thereof. A storage controller 19B also is provided within circuitry 19A and is configured for controlling various aspects of bifurcated storages system 12, such as where to save video files of different resolution and corresponding data transmission between various components of system 10. Imagining device's 18 circuitry 19A includes various camera-type of components or various circuitry elements, for example, a media encoder, a processor, and a non-transient memory storage device, among other components, including yet other implementation-specific components such as imagers, motion, vibration, sound, or smoke detecting sensors and corresponding circuit components, or the like.

Regardless of the particular type of imaging device 18, its circuitry 19A typically includes wireless I/O communication devices or radios for communicating with the base station hub 20. It is also conceivable that each radio, or another, dedicated radio (not shown) could communicate directly with corresponding radios of gateway router 22 or other imaging device(s) or other client devices within system 10. This direct communication could be achieved via Wi-Fi or a Bluetooth communication protocol, such as Bluetooth 5.0. Regardless, the imaging device 18 could be implemented as a video camera, such as an Arlo® camera available from Arlo Technologies, Inc. of Carlsbad, California.

Still referring to FIG. 1, although only one is imaging device 18 is shown for simplifying explanation, typically, system 10 will include multiple imaging devices 18 that are mounted to face toward the monitored zone MZ or respective areas or zones being monitored, such as around or within a building or other structure or area. In addition to containing a video camera as the imaging device 18, one or all of the imaging devices 18 (only one shown) may include one or more other sensors configured to detect one or more types of conditions or stimulus such as, for example, motion or heat. Imaging device 18 may further include audio-type devices, including microphones, sound sensors, and speakers configured for audio communication or providing audible alerts. The camera or imaging device 18 may also be incorporated into form factors of other house or building accessories, such as doorbells, floodlights, etc.

Still referring to FIG. 1, gateway router 22 is typically implemented as a WIFI hub that communicatively connects WLAN 14 to WAN 16 through the internet provider 30 with the WLAN hosted by the base station 20 operating as an access point to an IEEE 802.11 network. The hub or base station 20 can include base station electronic circuitry including a first wireless I/O communication device for communicating with the imaging devices over the WLAN 14, a second wired or wireless I/O communication device for accessing (WAN) 16, such as the Internet through a Local Area Network (LAN) connected to the gateway router 22, a processor and/or a non-transient memory storage, among other things.

Internet provider 30 may include hardware or system components or features such last-mile connection(s), cloud interconnections, DSL (digital subscriber line), cable, and/or fiber-optics. As mentioned, the functionality of the base station hub 20 also could be incorporated into the router 22, in which case the router 22 becomes the base station hub as well as the router. Another connection between WLAN 14 and WAN 16 may be provided by way of a mobile provider 32. Mobile provider 32 includes hardware or system components or features to implement various cellular communications protocols such as 3G, 4G, LTE (long term evolution), 5G, or other cellular standard(s). Each of the internet provider 30 and mobile provider 32 allows the components of system 10 to interact with a backend system or control services that can control functions or provide various processing tasks of components of system 10. The WAN 16 typically implements cloud data storage by way of various cloud storage devices, such as cloud-based server(s) 34, typically within a cloud-based backend control service system, which could be an Arlo SmartCloud™ system.

The server 34 can include or be coupled to a microprocessor, a microcontroller or other programmable logic element (individually and collectively considered "a controller") configured to execute a program. Alternatively, interconnected aspects of the controller and the programs executed by it could be distributed in various permutations within the imaging device 18, the base station 20, the user device 36, and the server 34. This program may be utilized in filtering, processing, categorizing, storing, recalling and transmitting data received from the imaging device 20 via the base station 14.

This program, while operating at the server level, may be utilized in filtering, processing, categorizing, storing, recalling and transmitting data received from the imaging device 18 via the base station 20. Server 34 may also be in communication with devices running AI-based processing programs such as computer vision program ("CV"), which can apply one or more filters or processes, such as edge detection, facial recognition, motion detection, etc., to detect one or more characteristics of the recording such as, but not limited to, identifying an individual, animal, vehicle, or package present in the recording. The server(s) 34 typically provides, for example, cloud storage of videos such as those of triggering events in the monitored zone MZ observed by the imaging device 18.

Still referring to FIG. 1, one or more user devices 36, such as a smart phone, tablet, laptop, or PC, may communicate with various components or devices within each of WLAN 14 and WAN 16 to provide an interface through which a user may interact with system 10. Each user device 36 includes a display system that typically includes both an audio display and a video display such as a touchscreen display 37. Each user device 36 also has internal computing and storage capabilities and a program or application, such as the Arlo Smart™ application, serving as the user interface with the remainder of system 10, which may include evaluating videos stored in the bifurcated storage system 12 of, for example, triggering events that occurred within the monitored environment or monitored zone MZ. Regardless of the particular configuration of user device 36, bifurcated storage system 12 includes an archive storage system 40 and a preview storage system 42 that cooperate to perform default or initial video storage at various locations within the bifurcated storage system 12 as a function of video quality or resolution values.

Figure 2:
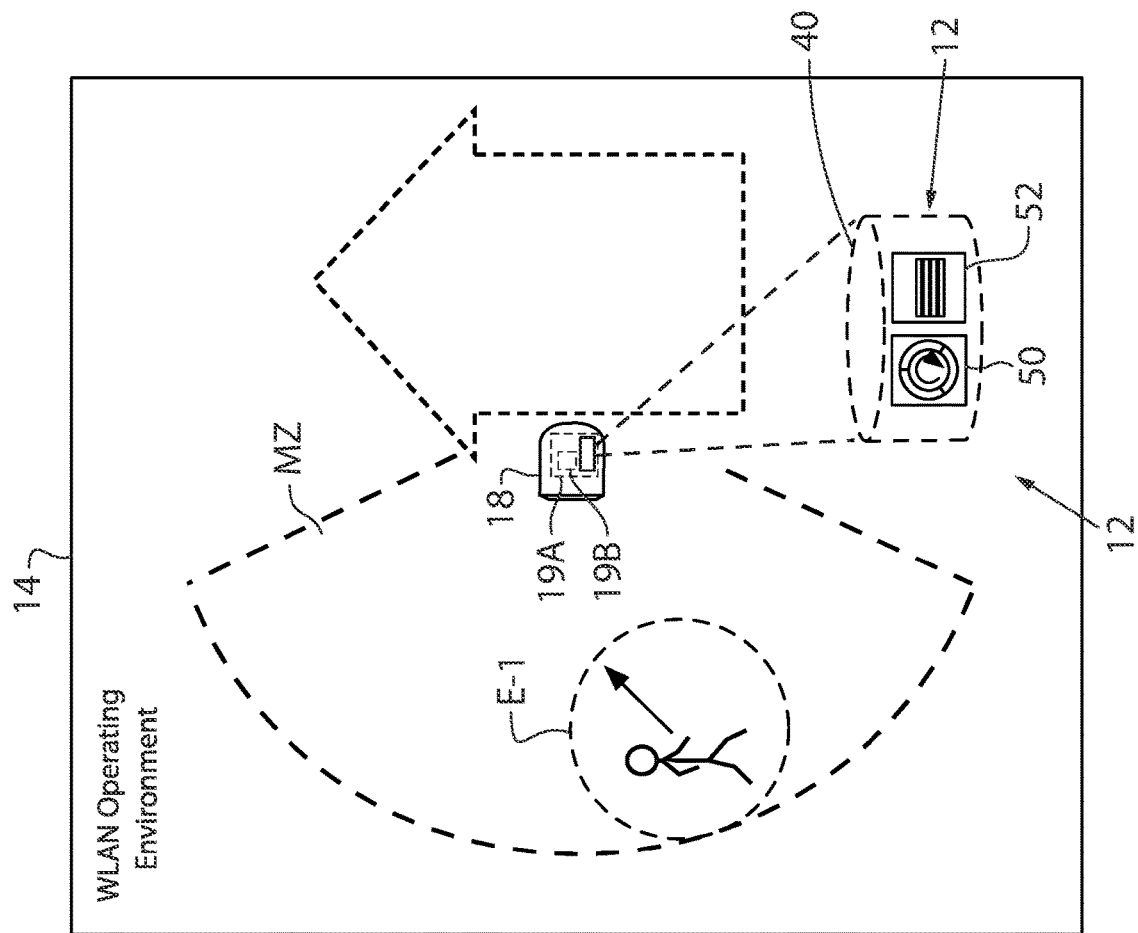
FIG. 2 is a schematic representation of portions of the system of FIG. 1 in accordance with an aspect of the invention with a triggering event in a monitored zone.
Figure 2:
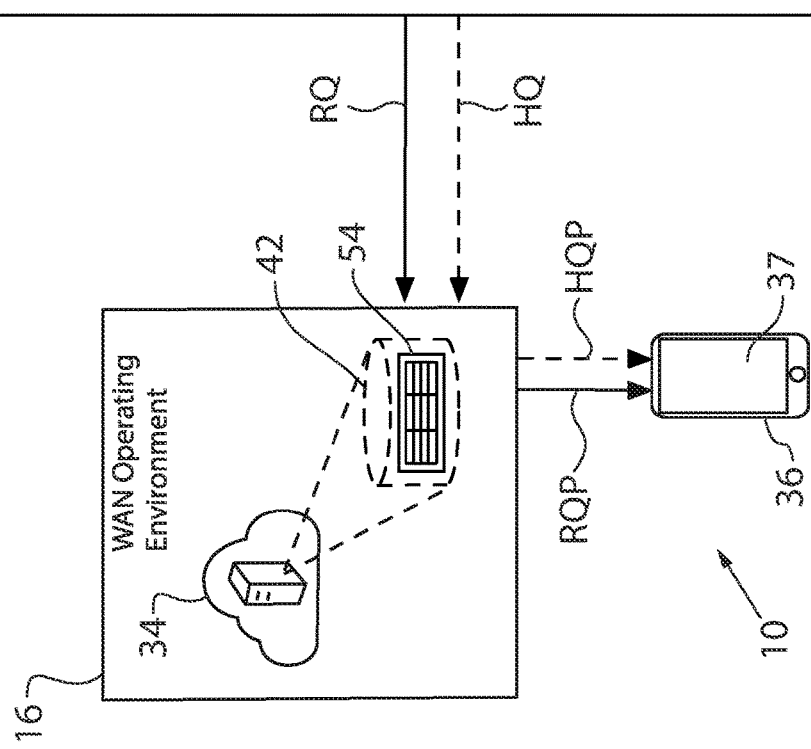

Referring now to FIG. 2, archive storage system 40 is typically provided within WLAN 14 and is shown here as being incorporated into on-board memory of imaging device 18. Archive storage system 40 includes buffer storage device 50 and archive storage device 52, which are configured for storing high-quality videos, such as high-resolution and/or low compression videos. High-resolution videos typically have resolution values of at least a Full HD format or a resolution of a resolution of 1920×1080 pixels, more typically values of a least a 2K format with a resolution of 2048×1080 pixels or values of at least a 4K format with a resolution of 3840×2160 pixels. It is understood that although described in terms of having high-resolution characteristics, the high-quality videos may have other characteristics that contribute to their image's clarity and also large file size. This may include the high-quality videos being uncompressed or subject to low-compression techniques, such as by way of lossless compression or other compression techniques having compression ratios of 10:1 or less, typically 5:1 or less, and most typically 2:1 or less. The high-quality videos may also have playback, transmission, or processing characteristics that contribute to their high-quality and large file sizes, such as bitrates of at least about 10 Mb/s, typically at least about 15 Mb/s, and more typically, about 20 Mb/s or more.

Buffer storage device 50 is shown here as a circular buffer and is a default temporary storage location for the high-quality videos that are captured by imaging device 18. Buffer storage device 50 includes memory and implements a buffer routine as, for example, a FIFO (first-in-first-out) data management methodology that allows the older/oldest videos stored in a buffer dataset of the buffer storage device 50 to be automatically overwritten, typically by overwriting the oldest data first according to circular buffer principles. The high-quality videos initially stored in the buffer storage device 50 may define "potential-archive high-quality videos" since, by default, these videos are queued to be overwritten but may be selectively archived as described elsewhere.

Conversely, archive storage device 52 is configured to retain data without being automatically overwritten. The high-quality videos stored in the archive storage device 52 define confirmed-archive high-quality videos. Typically, the confirmed-archive high-quality videos are created from the potential-archive high-quality videos. It is understood that the buffer and archive storage devices 50, 52 may be implemented within a common device and/or common database that may implement internal data moving between datasets to provide different buffer versus archive treatment or tagging or the like in order to prevent overwriting within the same location of the database.

Still referring to FIG. 2, in addition to capturing high-quality videos, such as high-resolution and/or low compression videos, imaging device's 18 circuitry 19A is configured to capture or create reduced-quality videos, such as low-resolution and/or high compression videos. The reduced-quality videos are typically a fraction of the size of the high-quality videos, such as one-half or less, typically one-fifth or less, and more typically one-tenth or less. Reduced-quality videos typically have lower resolution values than those of their high-quality video counterparts. The reduced-quality videos may have a resolution value of no more than that of Full HD format or a resolution of a resolution of 1920×1080 pixels or less, typically a resolution value of no more than an HD format with a resolution value of 1280×720 pixels, and may have a resolution value of no more than an SD 480p format with a resolution of 640×480 pixels or an SD 360p format with a resolution of 640×360 pixels. It is understood that although described in terms of having low-resolution characteristics, the reduced-quality videos may have other characteristics that contribute to their reduced or small file size, in comparison to the high-quality videos. This may include the reduced-quality videos being compressed or subject to high-compression techniques, such as by way of lossy compression or other compression techniques having compression ratios of 20:1 or greater, typically 40:1 or greater, such as 50:1 or greater. The reduced-quality videos may also have playback, transmission, or processing characteristics that contribute to their reduced-quality and small file sizes, such as bitrates of at about 8 Mb/s or less, typically about 5 Mb/s or less, and more typically, between about 2-3 Mb/s.

Still referring to FIG. 2, the reduced-quality videos may be stored in a data storage device(s) 54, which may be a storage drive of the server(s) 34, of the preview storage system 42 within WAN 16. A triggering event is represented as event E-1 that occurs within monitored zone MZ. Upon detecting event E-1, system 10 implements its bifurcated video storage protocol as a tiered assessment system that facilitates, for example, analyzing videos of different quality or resolution values, with initial reduced-quality (such as low-resolution) video analysis while preserving high quality (such as high-resolution) videos for subsequent preview and/or archive-type storage.

Figure 3:
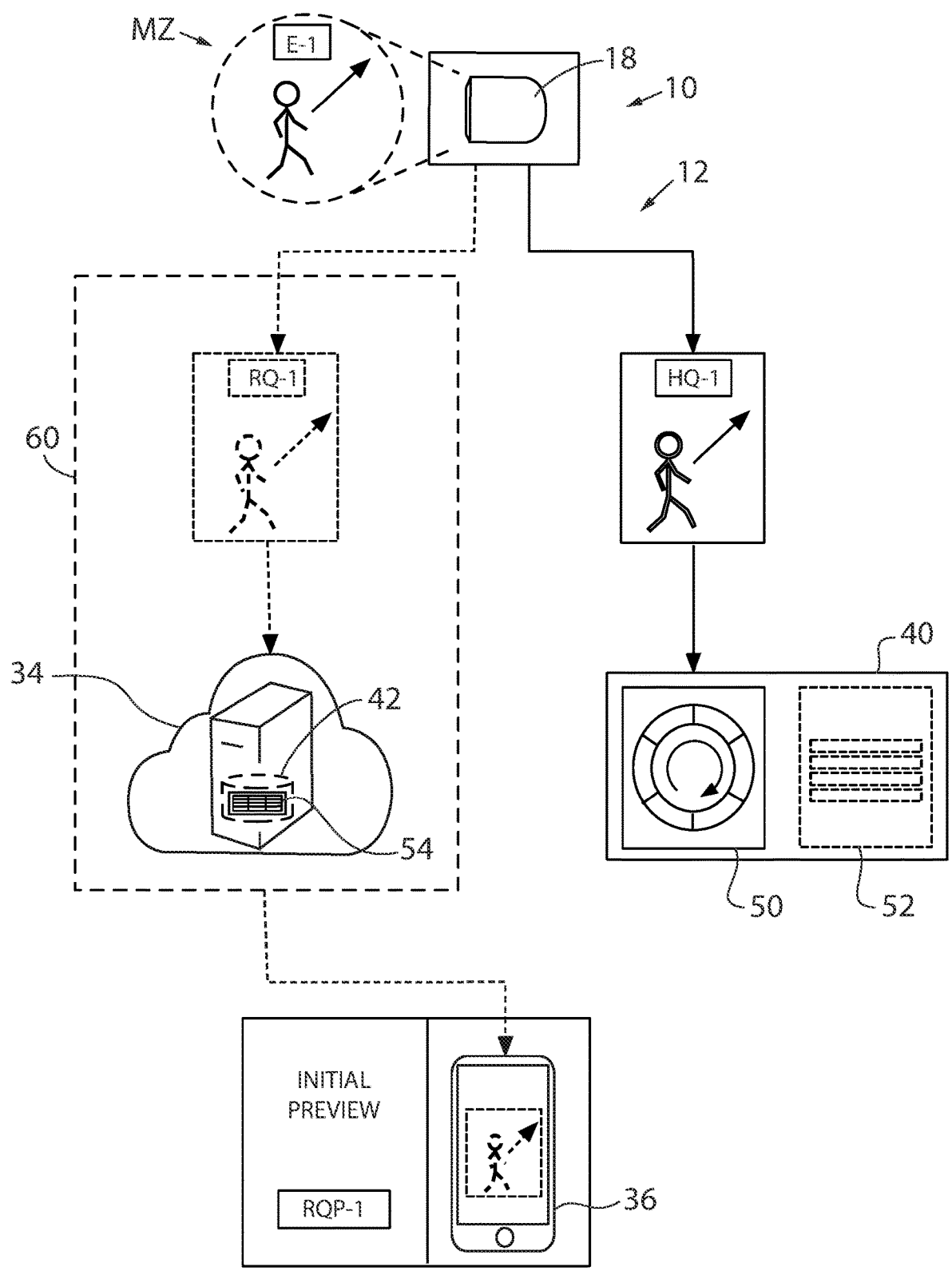
FIG. 3 is a schematic representation of portions of the system of FIG. 1 during an initial preview in accordance with an aspect of the invention.

Referring now to FIG. 3, a first phase of the tiered assessment includes generation and storage of a preliminary or initial reduced quality video presentation for user analysis. Image capture and transmission by imaging device 18 typically is activated by receipt of a command from the user device or, more typically, by detection of a triggering event, shown as event E-1. The detection may be done, for example, by way of motion detection or sound detection. That detection may be supplemented by various processing filters implemented through AI based processing or other tasks, such as computer vision, including specific image detecting features, so as to limit image capture and transmission to specific events, such as motion of a person or the sound of breaking glass. Upon the imaging device 18 detecting a triggering event, system 10 sends an alert to the user, which is received at the user device 36, such as an audible, visual, and/or tactile alert. When implemented in smart phone, such alerts typically include a push notification and/or an audio chime or similar sound. The alert is typically issued by communications from the WLAN 14, through the WAN 16, and to the user device 36 to inform the user of the detected event and to present preview options. Detection of event E-1 also initiates the imaging device's 18 recording of the event.

Still referring to FIG. 3, a reduced-quality video of event E-1, represented here as video RQ-1 which may be in the form of, for example, a low-resolution video, is sent from imaging device 18 to the storage of server 34 and stored in the preview storage system 42. Video RQ-1 is accessible for user analysis through user device 36, through its display on touchscreen display 37 (FIGS. 1-2). System 10 transmits at least a portion of video RQ-1 from preview storage system 42 to the display on the touchscreen display 37 or other display on the user device 36 as a reduced-quality preview, which may be a low-resolution preview video, represented as video RQP-1. Video RQP-1 may include encrypted communications between the preview storage system 42 and the user device 36. A reduced-quality preview phase is represented by the dashed enclosure 60 that surrounds video RQ-1, at least a portion of which is displayed on the touchscreen display 37 as video RQP-1.

Still referring to FIG. 3, while the reduced-quality preview video RQP-1 is accessible for analysis by the user in an initial preview, a high-quality version, which may be a high-resolution version, of a video capture of event E-1 is at least temporarily stored in archive storage system 40. The high-quality video is represented here as video HQ-1, which is initially temporarily stored in buffer storage device 50.

Figure 4:
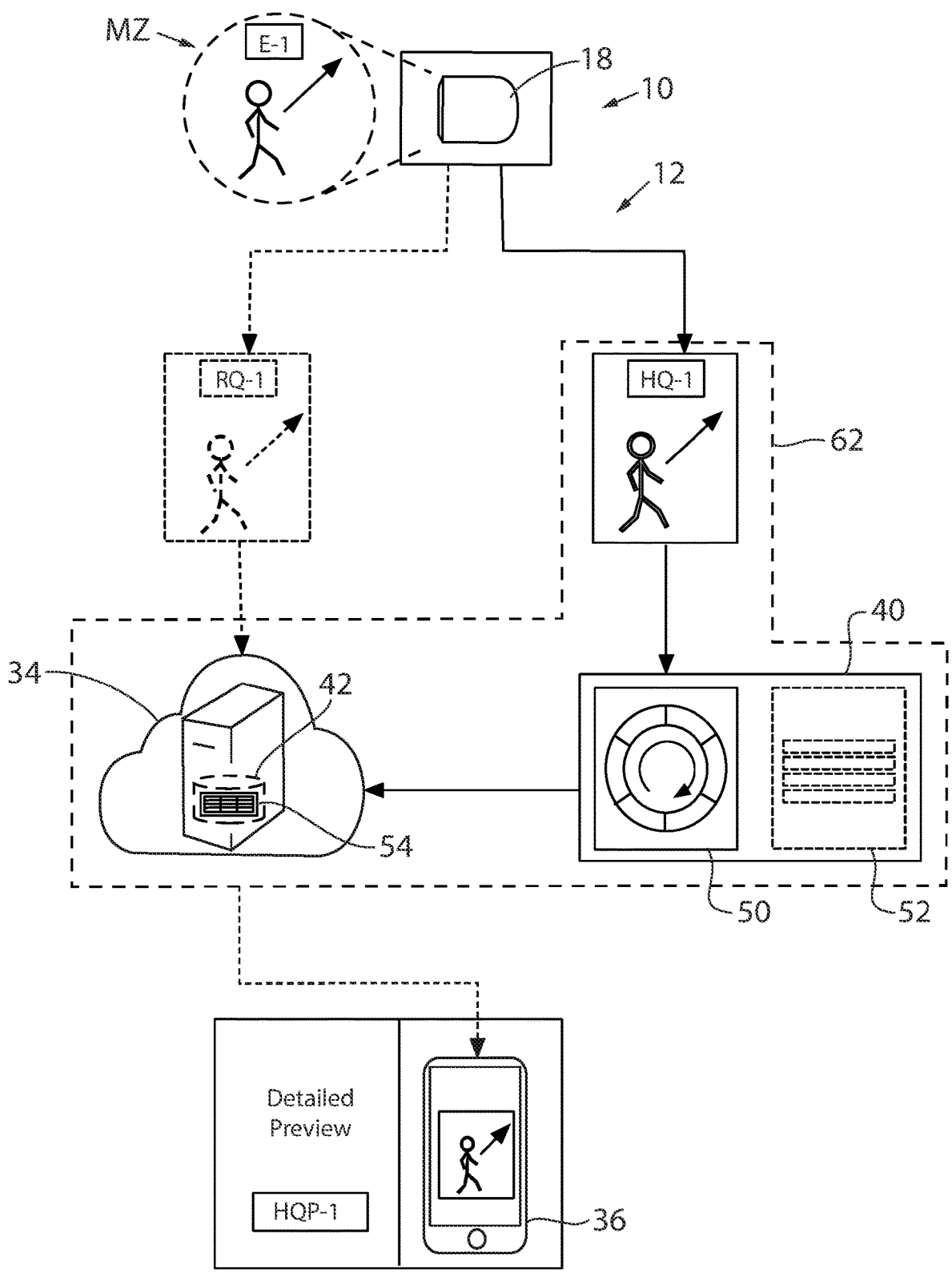
FIG. 4 is a schematic representation of portions of the system of FIG. 1 during a detailed preview in accordance with an aspect of the invention.

Referring now to FIG. 4, a second or subsequent phase of the tiered assessment includes the transmission of a detailed high-quality video, which may be a high-resolution video, to the touchscreen display 37 of the user device for user analysis. The high-quality video like the reduced-quality preview video(s), may be transmitted in an encrypted form and decrypted at the user device using, for example, an end-to-end encryption protocol. Upon user request by way of user device 36, at least a portion of the high-quality video HQ-1 is transmitted from the archive storage system 40 to the preview storage system 42. System 10 transmits at least a portion of video HQ-1 from preview storage system 42 for display on the touchscreen display 37 of the user device 36 as a high-quality preview video, which may be a high-resolution preview video, represented as video HQP-1. A high-quality preview phase is represented by the dashed enclosure 62 that surrounds video HQ-1 and the cloud storage of server 34, which may correspond to a detailed preview implemented through user device 36.

Figure 5:
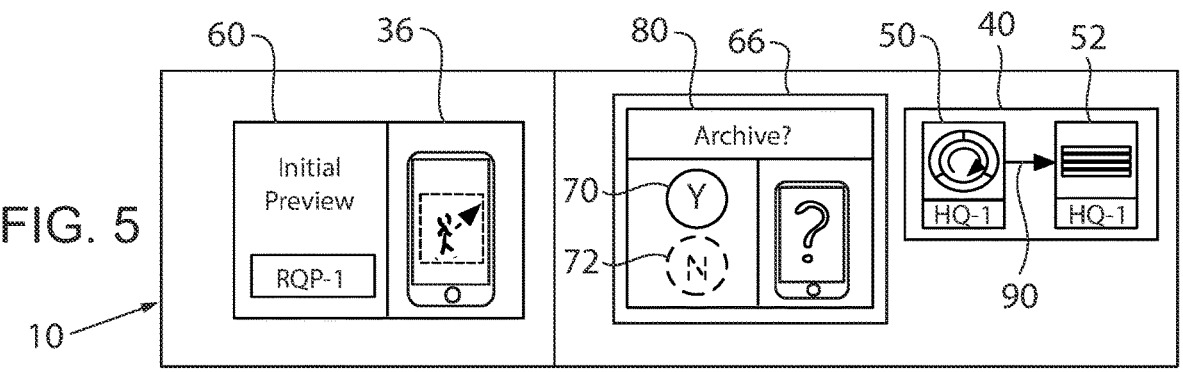
FIG. 5 is another schematic representation of portions of the system of FIG. 1 during an initial preview in accordance with an aspect of the invention.
Figure 6:
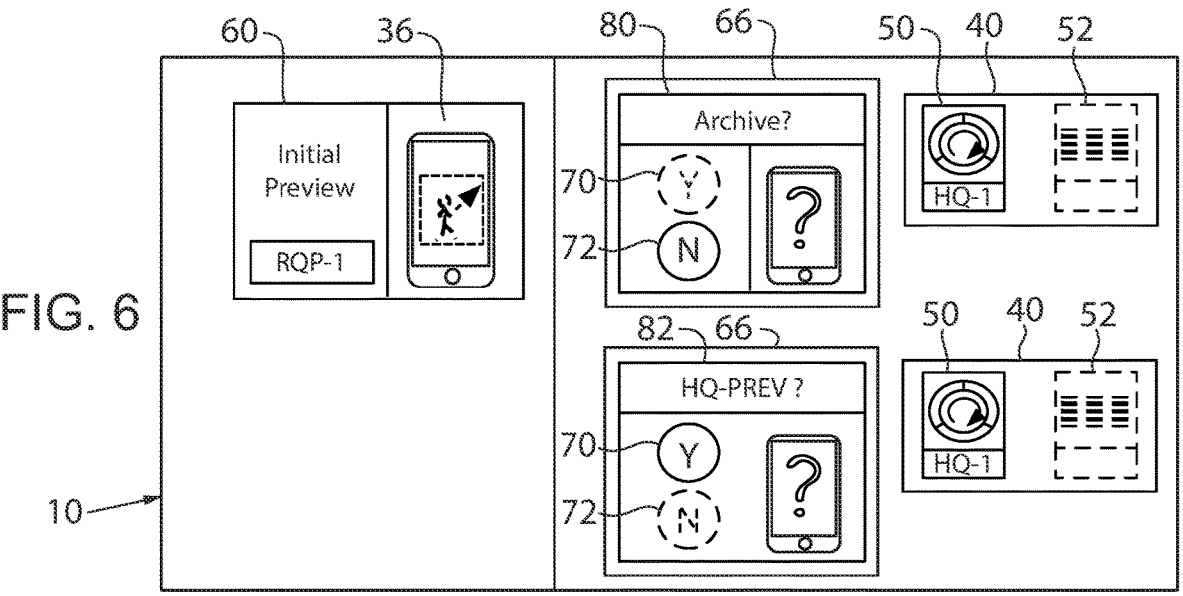
FIG. 6 is another schematic representation of portions of the system of FIG. 1 during an initial preview in accordance with an aspect of the invention.
Figure 7:
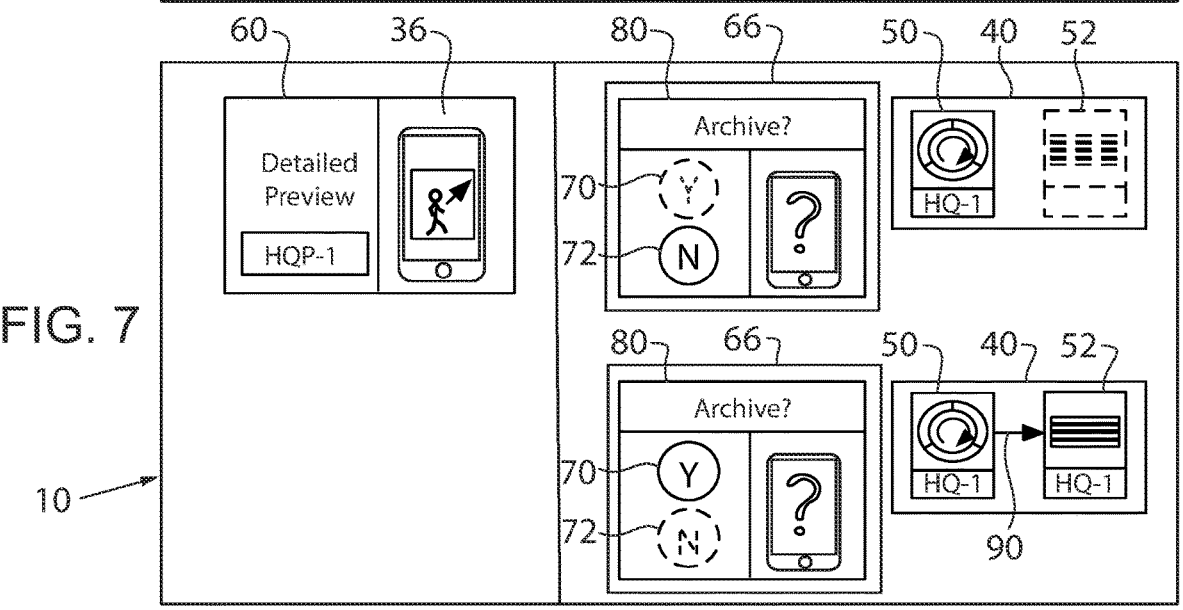
FIG. 7 is another schematic representation of portions of the system of FIG. 1 during a detailed preview in accordance with an aspect of the invention.

Referring generally to FIGS. 5-7, at various phases during the tiered assessment through system 10, high-quality videos may be preserved within archive system 40. Preserving high-quality videos typically includes, for example, moving or coping the videos from the buffer storage device 50 to the archive storage device 52 within archive system 40. Preserving the videos may be accomplished by tagging the video to prevent their overwriting. This tagging or other preservation changes the video status from a potential-archive high-quality video that can be automatically overwritten in the buffer storage device 50 to a confirmed-archive high-quality video that is preserved or archived in a manner that prevents its automatic overwriting by storage in the archive storage device 52. By way of user device 36, a user may send an instruction to system 10 to save, preserve, or archive the high-resolution video, such as by creating a confirmed-archive high-quality video stored in the archive storage device's 52 archive dataset from a potential-archive high-quality video stored in the buffer storage device's 50 buffer dataset. The user device's 36 touchscreen display 37 may display a GUI (graphical user interface) 66 that provides virtual buttons that allow for delivering a user's instructions or inputs to system 10, including for commanding archive-type preservation of high-quality videos within archive storage system 40. Virtual buttons are shown here as yes-button 70 and no-button 72 as seen in FIGS. 5-8.

Referring specifically to FIG. 5, during an initial preview as a reduced-quality preview phase 60, reduced-quality preview video RQP-1 is displayed on the touchscreen display 37 of user device 36. After analyzing video RQP-1, a user may determine that the event is of sufficiently high-interest to archive a high-quality video, which may be a high-resolution video, of the event. To permit this determination, system 10 commands GUI 66 to display an archive request 80, shown here presenting an option to archive the video by pressing the yes button 70. By pressing the yes button 70 as an input, the user commands system 10 to save, preserve, or archive a high-quality video, which may be a high-resolution video, of the event. This high-quality archiving is represented as a conversion 90 of a potential-archive high-quality video in buffer device 50 to a confirmed-archive high-quality video in archive device 52. The confirmed high-quality video will be maintained until, for example, it is deletion by the user or upon expiration of a fixed or user-defined time period.

Referring now to FIG. 6, the reduced-quality preview video RQP-1 may not provide sufficient information for a user to decide whether to archive a high-quality video of the event. In such a situation, in response to the archive request 80, the user may choose to not archive a high-quality video by pressing the no button 72 as an input. Accordingly, the high-quality video is maintained in buffer storage device 50 but is not preserved by saving it in the archive storage device 52. System 10 may command GUI 66 to display a high-quality preview request 82. If the user presses the no button 72 and declines a high-quality preview, then the high-resolution video remains only in the buffer storage device 50 and will eventually be automatically overwritten as additional video files are saved onto the buffer storage device 50. If the user presses the yes button 70, a high-quality preview is initiated to allow the user to analyze the video in more detail.

Referring now to FIG. 7, at a request for a high-quality detailed preview, at least a portion of the high-quality video HQ-1 is transmitted from the buffer storage device 50 (FIG. 4) of the archive storage system 40 (FIG. 4) to the data storage device 54 (FIG. 4) of the preview storage system 42 (FIG. 4). From the preview storage system 42 (FIG. 4), at least a portion of the high-quality video is transmitted to the user device 36 for a detailed preview as a high-quality preview video HQP-1. System 10 may again command display of the archive request 80 on GUI 66. Declining to archive by a user pressing the no-button 72 prevents the storing of high-quality video HQ-1 onto archive storage device 52. A user commands the preservation of the high-quality to change its state from a potential-archive high-quality video to a confirmed-archive high-quality video through conversion 90 by pressing the yes-button 70.

Figure 8:
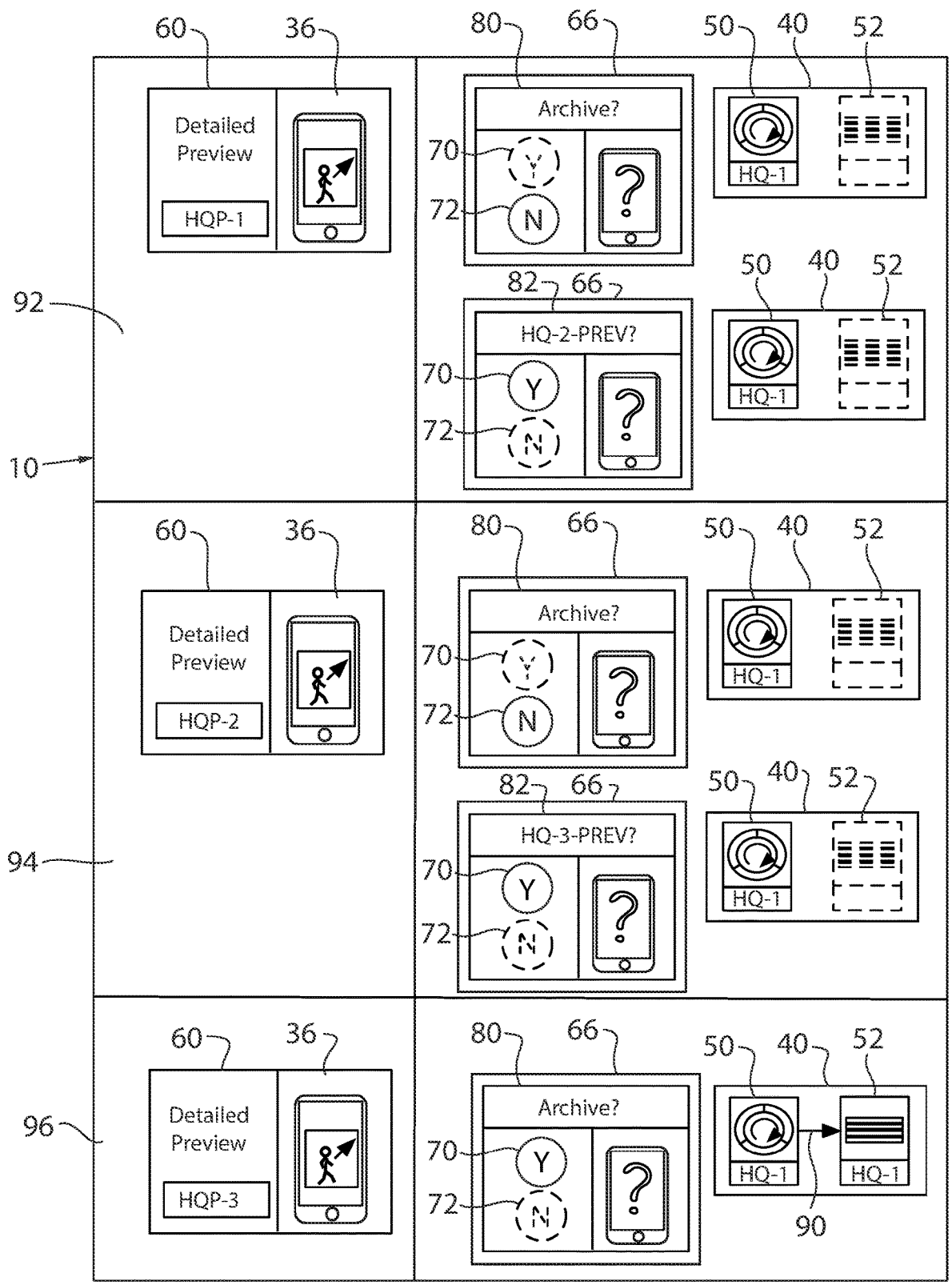
FIG. 8 is another schematic representation of portions of the system of FIG. 1 during a detailed preview in accordance with an aspect of the invention.

Referring now to FIG. 8, this detailed preview includes multiple preview sub-phases with the system 10 to provide different high-quality materials, which may be high-resolution materials, at discrete preview events, with each event presenting an opportunity to preserve the high-quality video by saving it onto the archive storage device. Three preview events are shown with the top row representing a first preview event 92 of high-quality preview video HQP-1, the middle row representing a second preview event 94 of high-quality preview video HQP-2, and the bottom row representing a third preview event 96 of high-quality video HQP-3. At each archive refusal, system 10 presents an option for a subsequent analysis of additional high-quality materials. At the first preview event 92, refusing to archive by pressing no-button 72 prompts system 10 to present an option for a preview of a second high-quality video HQP-2. Likewise at the second preview event 94, refusing to archive by pressing no-button 72 prompts system 10 to present an option for a preview of a third high-quality video HRP-3. The third preview event 96 shows an instruction to preserve the high-quality video through its conversion 90 from a potential-archive high-quality video to a confirmed-archive high-quality video by pressing yes-button 70 at the archive request 80.

Still referring to FIG. 8, the different high-quality preview videos HQP-1, HQP-2, HQP-3, may be subsequent segments of the high-quality video HQ-1 stored in buffer storage device 50. The subsequent segments may be presented on their own or may be compiled onto the previous video segment so that each subsequent video preview shows a longer clip as a segment of the high-quality video HR-1. Although represented as a sequential review(s), it is understood that the previews may be in other orders, such as with gaps between the segments, for example, HQP-1, HQP-2, and HQP-5. This may be achieved by the user selecting which segment to review at any given time by, for example, selecting a particular segment to analyze next from a presentation of representative image frames on touchscreen display 37 (FIGS. 1-2). The additional video segments may be of equal length, or each subsequent segment may be progressively longer in duration than the previous segment so that cloud storage demands of the preview storage system 42 progressively increase with further detailed preview requests. Although described in terms of videos, the high-quality previews may include or be high-quality still images, which may be high-resolution still-images, such as frames extracted from the high-quality video HR-1.

It is contemplated that at least some of the preserving or archiving decisions may be at least partially automated. Storage controller 19B (FIGS. 1-2) may implement a default saving of a high-quality video onto the archive storage device 52 upon the system's 10 recognition of any of various high interest events. The high interest events that may trigger automatic high-quality video archiving are typically predefined by a user. The predefinition may be performed by inputting various parameters through an auto-archive feature presented through GUI 66 that may correspond to abnormal activity for a particular monitored zone MZ (FIGS. 1-2). Examples may include utilizing computer vision-based person recognition features for the system 10 to automatically recognize a presence of a person in a monitored zone MZ (FIGS. 1-2) in which no people are expected or at certain times of day, in which case the system 10 automatically archives the high-quality video by way of saving the video to archive storage device 52 or by tagging or otherwise preventing overwriting of the video in the buffer storage device 50. Other examples of auto-archiving may include high-quality video that was recorded based on movement detected inside a structure during user-defined times at which no movement is expected or based on a detected vehicle in a location at which no vehicles are expected.

Figure 9:
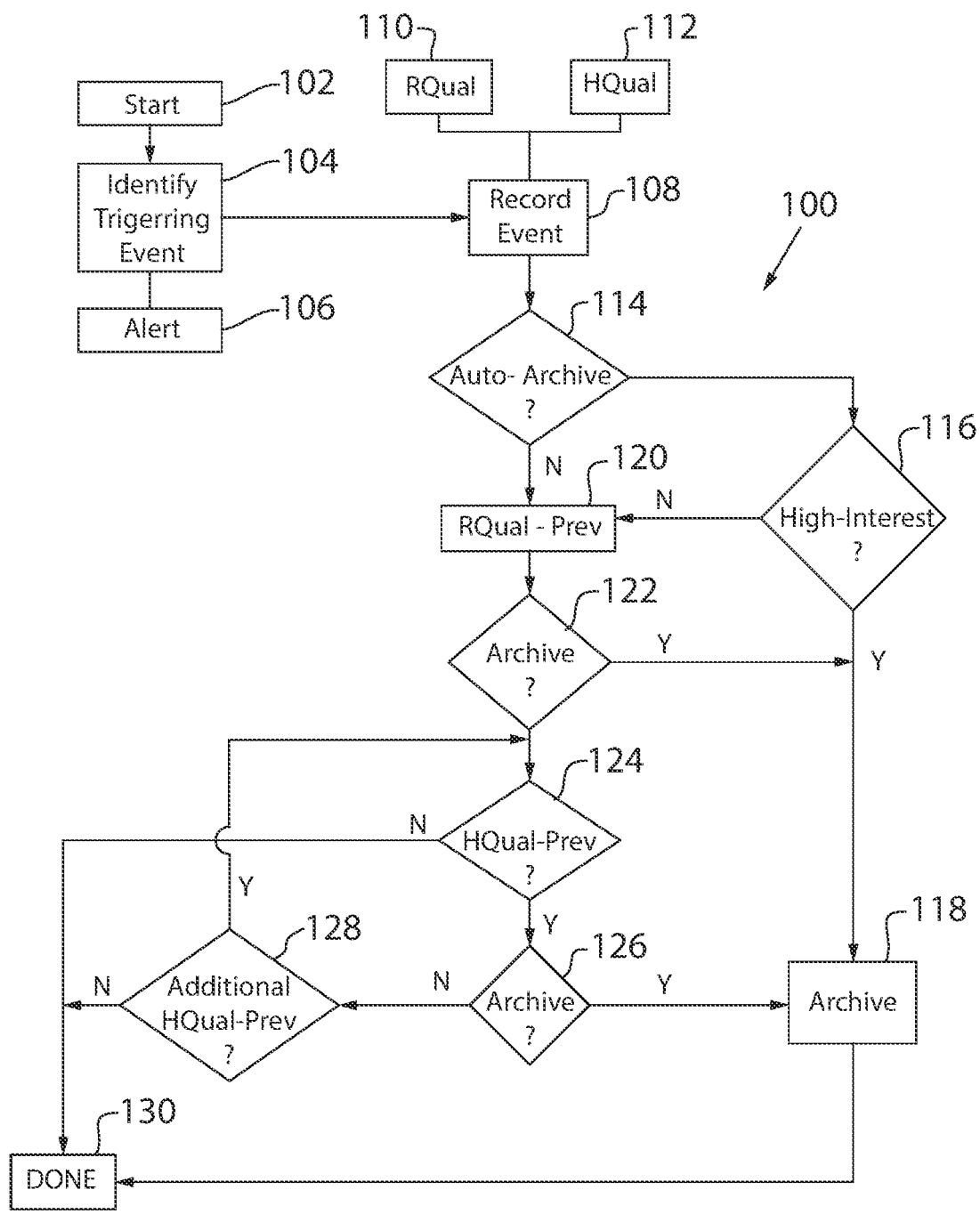
FIG. 9 is a flowchart illustrating a tiered assessment for selectively archiving high-resolution videos in accordance with an aspect of the invention.

Referring now to FIG. 9 and with background reference to FIGS. 1-8, a tiered assessment of a triggering event detected within a monitored zone MZ (FIGS. 1-2) by implementing a bifurcated video storage system 12 (FIGS. 1-4) is schematically shown in the flowchart as process 100. Process 100 proceeds from START at block 102 to block 104, where the imaging device 18 detects a triggering event. System 10 then sends an alert to user device 36 at block 106, and imaging device 18 begins recording the event at block 108. Storage controller 19B commands storing video recording or saving of the event in at least two quality levels, such as at two resolutions, at different locations within bifurcated video storage system 12. At blocks 110 and 112, reduced-quality and high-quality videos, which may be low-resolution and high-resolution videos, are respectively stored in preview storage system 42 and archive storage system 40. Preview storage system 42 may be cloud-based or otherwise offsite and archive storages system 40 may be onsite or on the imaging device 18. Default storage locations include a data storage device 54 of the preview storage system 42 for storing the reduced-quality video and a buffer storage device 50 of the archive storage system 40 for storing the high-quality video. At decision block 114, if system 10 implements auto-archive feature or strategy, then storage controller 19B evaluates whether the triggering event corresponds to a high-interest event based on stored criteria at decision block 116. If the storage controller 19B determines that the event is a high-interest event, then the high-quality video is preserved or archived at block 118 by being stored in the archive storage system. Preservation may include converting the high-quality video from a potential-archive high-quality video to a confirmed-archive high-quality video. Alternatively, the preservation may include copying the high-quality video from the buffer storage device 50 to the archive storage device 52 or by tagging or otherwise preventing its overwriting. If system 10 does not implement an auto-archive feature or strategy at decision block 114 or if the event is not determined in block 116 to be a high-interest event, then an initial or reduced-quality preview is presented for viewing through user device 36 at block 120. At decision block 122, an archive request 80 is presented at the user device 36. If the user chooses to preserve the high-quality video based on previewing the reduced-quality video, the user delivers a corresponding input through the user device 36 by pressing the yes button 70 as a save request or archive request, and the storage controller 19B commands the archiving of the high-quality video in storage system 40 at block 118. If, based on analyzing the reduced-quality video, the user chooses not to preserve the high-quality video by pressing no button 72, then the storage controllers 19B commands the presenting of an option for a high-quality preview on the user device 36, which the user exercises or declines by pushing either the yes button 70 or the no button 72 at decision block 124. At decision block 126, if the user chooses to preserve the high-quality video by pressing the yes button 70 after previewing the high-quality video, the storage controllers 19B commands the archiving of the high-quality video at block 118. If the user chooses not to preserve the high-quality video by pressing the no button 72 after previewing the high-quality video, and if there is no additional high-quality material available for preview at decision block 128, then the tiered assessment ends at block 130. If there are additional high-quality materials available for preview, then the storage controller 19B commands the presenting an option in decision block 128 for additional high-quality preview(s). If this option is accepted by pushing the yes button 70, the process returns to a high-quality preview at decision block 124 and repeats until the tiered-assessment ends at block 130. If the option is declined by pressing the no button 72, the process simply ends.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. An electronic monitoring system comprising:
    an imaging device configured to monitor a monitored zone for detecting and capturing video of the monitored zone upon the detection of a triggering event;
    a bifurcated video storage system that includes:
        an archive storage system that is configured to store videos of the monitored zone at a first resolution value or a first compression value to define HQ (high-quality) videos;
        a preview storage system that is configured to store videos of the monitored zone at a second resolution value that is lower than the first resolution value or a second compression value that is greater than the first compression value to define RQ (reduced-quality) videos;
    wherein, upon detection of a triggering event by the imaging device, the bifurcated video storage system is configured to:
        store an HQ video of the monitored zone in the archive storage system;
        store an RQ video of the monitored zone in the preview storage system;
    during a tiered assessment event:
        1) as a first preview stage of the tiered assessment event, and upon receipt of an initial preview request from a user device that includes a user interface and that is in communication with the electronic monitoring system, transmit at least a portion of the RQ video from the preview storage system as an RQP (reduced-quality preview) video for display on the user device; and
        2) as a second preview stage of the tiered assessment event, and upon receipt of a subsequent preview request from the user device:
            transmit at least a portion of the HQ video from the archive storage system to the preview storage system; and
            transmit at least a portion of the HQ video from the preview storage system as an HQP (high-quality preview) video for display on the user device.

2. The electronic monitoring system of claim 1, wherein the archive storage system includes:
    a buffer storage device that is configured to store PA-HQ (potential-archive high-quality) videos; and
    an archive storage device that is configured to store CA-HQ (confirmed-archive high-quality) videos.

3. The electronic monitoring system of claim 2, wherein:
    the bifurcated storage system is configured to create the HQP video from at least a portion of the PA-HQ video.

4. The electronic monitoring system of claim 3, wherein:
    the buffer storage device includes a circular buffer with a buffer dataset, and the PA-HQ videos are temporarily stored in the buffer dataset of the circular buffer.

5. The electronic monitoring system of claim 4, wherein:
    the archive storage device includes an archive dataset, and the CA-HQ videos are stored in the archive dataset.

6. The electronic monitoring system of claim 5, wherein:
    the bifurcated storage system is configured to create the CA-HQ video from the PA-HQ video.

7. The electronic monitoring system of claim 6, wherein the bifurcated video storage system includes a storage controller and creates the CA-HQ video from the PA-HQ video in response to at least one of:
    receiving an input from the user device indicating that the triggering event corresponds to a high-interest event; and
    a determination by the storage controller that the triggering event corresponds to a high-interest event.

8. The electronic monitoring system of claim 1, wherein:
    both the imaging device and the archive storage system are arranged within a common WLAN (wireless local area network).

9. The electronic monitoring system of claim 8, wherein:
    the preview storage system is arranged within a WAN (wide area network) that is communicatively connected to the WLAN.

10. The electronic monitoring system of claim 9, wherein:
    the archive storage system includes a storage device that is mounted in the imaging device; and
    the preview storage system includes a cloud-based server.

11. The electronic monitoring system of claim 10, wherein the storage device of the archive storage system includes a buffer storage device.

12. The electronic monitoring system of claim 11, wherein the buffer storage device is defined by a circular buffer that stores a buffer dataset in the imaging device.

13. The electronic monitoring system of claim 12, wherein the archive storage system includes a storage device that stores an archive dataset in the imaging device.

14. A method for operating an electronic monitoring system to monitor a monitored zone, the method comprising:
    detecting a triggering event with an imaging device;
    in response to detection of the triggering event, storing a video of the monitored zone with a bifurcated video storage system, including:
        storing a video of the monitored zone in an archive storage system at a first resolution value or a first compression value to define an HQ (high-quality) video;
        storing a video of the monitored zone in a preview storage system at a second resolution value that is lower than the first resolution value or a second compression value that is greater than the first compression value to define an RQ (reduced-quality) video;
    during a tiered assessment event:
        1) as a first preview stage of the tiered assessment event, and in response to the receipt of an initial preview request from a user device in communication with the electronic monitoring system, transmitting at least a portion of the RQ video as an RQP (reduced-quality preview) video for display on the user device; and
        2) as a second preview stage of the tiered assessment event, and in response to a high-quality preview request from the user device:
            transmitting at least a portion of the HQ video from the archive storage system to the preview storage system; and
            transmitting at least a portion of the HQ video as an HQP (high-quality preview) video for display on the user device.

15. The method of claim 14, wherein the archive storage system includes a buffer storage device that includes a circular buffer with a buffer dataset and an archive storage device that includes an archive dataset, with the method further comprising:
    storing the HQ video in the buffer dataset;
    in response to receipt of an HQ video preview request from the user device:
        transmitting at least a portion of the HQ video from the archive storage system to the preview storage system; and transmitting at least a portion of the HQ video from the preview storage system as an HQP (high-quality preview) video for display on the user device.

16. The method of claim 15, further comprising:

in response to an HQ video save request from the user device:

transmitting at least a portion of the HQ video from the circular buffer to the archive storage device; and storing the HQ video in the archive dataset.

17. The method of claim 16, wherein:

the bifurcated video storage system includes a storage controller;

the HQP video has a shorter duration than the HQ video; and the method further comprises:

tagging, with the storage controller, a segment of the HQ video to correspond to a representation of the HQP video within the HQ video.

18. The method of claim 15, wherein:

the HQ video preview request defines a first HQ video preview request;

the HQP video defines a first HQP video that corresponds to a first segment of the HQ video;

and wherein the method further comprises:

in response to receipt of a second HQ video preview request from the user device, transmitting a second HQP video that corresponds to a second segment of the HQ video from the preview storage system to the user device.

\* \* \* \* \*